United States Patent [19]

McCord

[11] 4,342,303
[45] Aug. 3, 1982

[54] FUEL VAPORIZER AND CARBURETOR PREHEATER SYSTEM

[76] Inventor: Robert L. McCord, 2000 Mark Ct., Kokomo, Ind. 46901

[21] Appl. No.: 187,411

[22] Filed: Sep. 15, 1980

[51] Int. Cl.³ .......................................... F02M 31/00
[52] U.S. Cl. .................................. 123/557; 123/553; 123/546
[58] Field of Search .............. 123/557, 546, 545, 593, 123/142.5; 261/144, 145; 219/206, 207, 302, 325, 326, 378, 205; 165/104.19

[56] References Cited

U.S. PATENT DOCUMENTS

| | | | |
|---|---|---|---|
| 1,318,068 | 10/1919 | Giesler | 123/557 |
| 1,326,000 | 12/1919 | Schmid | 219/326 |
| 3,042,016 | 7/1962 | Christian | 123/546 |
| 3,482,556 | 12/1969 | Ferriday | 123/557 |
| 3,498,279 | 3/1970 | Seeley | 123/557 |
| 3,892,211 | 7/1975 | Oyama | 123/557 |
| 3,906,914 | 9/1975 | Kirkbride | 123/546 |
| 3,952,716 | 4/1976 | McCauley | 123/590 |
| 3,973,543 | 8/1976 | Nakada | 123/590 |
| 3,985,112 | 10/1976 | Jordan | 123/552 |
| 4,020,812 | 5/1977 | Hayward | 123/549 |
| 4,027,639 | 6/1977 | Amano | 123/557 |
| 4,029,065 | 6/1977 | Wood | 123/546 |
| 4,031,876 | 6/1977 | Hoots | 123/590 |
| 4,050,430 | 9/1977 | Amagai | 123/556 |
| 4,068,638 | 1/1978 | Butler | 123/545 |
| 4,072,138 | 2/1978 | Hawkins | 123/557 |
| 4,083,340 | 4/1978 | Furr | 123/557 |
| 4,083,343 | 4/1978 | Paton | 123/585 |
| 4,089,314 | 5/1978 | Bernecker | 123/557 |
| 4,106,455 | 8/1978 | Vance | 123/557 |
| 4,108,953 | 8/1978 | Rocco | 123/549 |
| 4,137,875 | 2/1979 | Medina | 123/585 |
| 4,157,700 | 6/1979 | Conner | 123/557 |
| 4,311,128 | 1/1982 | Bernecker | 123/557 |

*Primary Examiner*—Ronald H. Lazarus
*Attorney, Agent, or Firm*—Woodard, Weikart, Emhardt & Naughton

[57] ABSTRACT

An apparatus for preheating the fuel and carburetor of an internal combustion engine and for improving vaporization of the fuel is disclosed herein which comprises a fuel chamber received within a cylindrical heat chamber including a heated liquid therein. The apparatus further includes a vaporization assembly mounted between the carburetor and intake manifold and providing, consecutively, a first screen, heat tubes and second screen. Means are provided for circulating the heat medium between the heat chamber, in which the medium is heated, and the vaporization assembly. Pump means are also provided for moving the fuel from the fuel chamber to the carburetor.

10 Claims, 4 Drawing Figures

FUEL VAPORIZER AND CARBURETOR PREHEATER SYSTEM

BACKGROUND OF THE INVENTION

1. Field of the Invention

The present invention relates generally to devices for use with internal combustion engines and specifically for vaporizing the conventional liquid-type fuel into a gas vapor prior to use by said engine for increased efficiency and reduced pollutants, and also for preheating the carburetor to assist in operation of the engine.

2. Description of the Prior Art

It has been known in the prior art to vaporize liquid fuel into the gaseous state by the use of heat exchange systems in contact with the hot exhaust manifolds of the engines with which the fuel is used. Also, such systems are known using heat exchange systems associated with the muffler and tail pipe systems of such engines. Other combinations use the engine coolant system for heating the liquid fuel. In U.S. Pat. No. 4,106,455, issued to Vance on Aug. 15, 1978, there is disclosed a vaporizer system for gasoline engines which utilizes a fuel line from the pressurized gas tank and passing through the oil pan reservoir to heat the liquid fuel. The fuel is vaporized and passes through the exhaust manifold to maintain the vapor state until it is fed to the carburetor.

Several prior art systems have been proposed for pre-vaporization of the fuel prior to its entry into the intake manifold of an engine in order to provide for more complete combustion of the fuel. For example, U.S. Pat. No. 3,498,279, issued to Seeley, teaches passing the raw gasoline over a hot surface prior to introduction into the carburetor of a standard internal combustion engine or the cylinder of a diesel engine. The surface is heated either by an electrically operated heater or a gas heated countercurrent exchanger employing the hot gaseous products of combustion. U.S. Pat. No. 3,952,716, issued McCauley, discloses a system in which a fuel/air mixture is oscillated by means of a rotor, subjected to sonic vibration, and then passed through a heated grid or screen to promote vaporization. U.S. Pat. No. 3,973,543, issued to Nakada, discloses a system for promoting vaporization of fuel within the intake manifold of an engine by means of an intensive electric field. In U.S. Pat. No. 4,157,700, issued to Conner on June 12, 1979, there is disclosed a pre-vaporization system which utilizes microwaves from a magnetron data transfer medium surrounding a tubular coil in which the liquid gas is vaporized.

The ideal carburetor would pass a mixture of completely vaporized fuel and air in the proper proportion to the intake manifold and cylinders. Complete vaporization of the fuel is not achieved in present day carburetors, however, because of the varying composition of the fuel and other limitations. Moreover, no matter how well mixed and vaporized the fuel mixture may be as it leaves the carburetor, its characteristics are changed as it passes through the manifold. Cold surfaces in the manifold will cause some of the vaporized fuel to condense, and changes in direction of flow will through inertia cause some portions of the mixture to settle out.

Many devices have been proposed to aid the carburetor in breaking up and vaporizing the fuel by heating either the carburetor or the intake manifold. Some of these devices have included means for bringing exhaust gases from the exhaust manifold to the carburetor or to the intake manifold, hot water jackets surrounding the carburetor or the intake manifold, electrical heaters in the carburetor, and so forth. None of these devices has been entirely satisfactory, however, because vaporization of all the gasoline is usually still incomplete until the end of the compression stroke in the cylinder. Combustion is therefore incomplete, resulting in lower engine efficiency and higher amounts of exhaust pollutants. Many of these devices are also expensive, difficult to install, ineffective or similarly unsatisfactory.

Some of the prior art devices are employed prior to the fuel entering the carburetor. In U.S. Pat. No. 4,072,138, issued to Hawkins et al. on Feb. 7, 1978, there is disclosed a fuel system which heats the fuel between the carburetor and the fuel pump with heat derived from a counter-flow circulation through the hot water of the engine cooling system. An isothermal fuel supply system is disclosed in U.S. Pat. No. 4,027,639, issued to Amano on June 7, 1977, in which the fuel to the carburetor is preheated by heat exchange with the engine cooling water. Means for superheating the fuel under pressure and then directing it to the carburetor are disclosed in U.S. Pat. No. 4,083,340, issued to Furr et al. on Apr. 11, 1978.

Many of the other prior art devices involve systems in which the fuel or fuel vapor is treated after passage into the carburetor. The carburetor design disclosed in U.S. Pat. No. 4,029,065, issued to Wood on June 14, 1977, uses a finned heat exchanger connected to the engine cooling system and inserted between the carburetor nozzle and intake manifold to help vaporize the fuel. The carburetor disclosed in U.S. Pat. No. 4,089,314, issued to Bernecker on May 16, 1978 includes porous matter within the carburetor to effect vaporization of the fuel. The devices disclosed in U.S. Pat. No. 4,050,430, issued Amagai et al. on Sept. 27, 1977, and U.S. Pat. No. 4,083,343, issued to Paton on Apr. 11, 1978, include means for heating the air utilized by the carburetor for combination with the vaporized fuel.

In U.S. Pat. No. 4,137,875, issued to Medina on Feb. 6, 1979, there is disclosed an auxiliary air inlet device for internal combustion engines which includes a plate mounted between the carburetor and the manifold and having a cavity for admitting air from the atmosphere to the air/fuel mixture. The fuel atomizing unit disclosed in U.S. Pat. No. 4,020,812, issued to Hayward on May 3, 1977, includes several plates providing an aperture aligned between the carburetor and the intake manifold and having spaced apart screens with an electric heating element therebetween. In U.S. Pat. No. 3,892,211, issued to Oyama on July 1, 1975, there is disclosed a fuel/air mixture heating device in which the fuel from the carburetor is heated prior to entrance to the intake manifold. The fuel vaporizing device disclosed in U.S. Pat. No. 4,108,953, issued to Rocco on Aug. 22, 1978, includes a coaxial heating coil and screen through which the fuel is passed. The fuel vaporizing apparatus shown in U.S. Pat. No. 4,068,638, issued to Butler on Jan. 17, 1978, provides several metal balls or other items to have flow surfaces for mixing the fuel/air mixture received from the carburetor. An apparatus for improving fuel vaporization which uses a heat exchange for the fuel/air mixture with the engine exhaust gas or another high temperature fluid is disclosed in U.S. Pat. No. 3,985,112, issued to Jordan on Oct. 12, 1976. In U.S. Pat. No. 4,031,876, issued to Hoots on June 28, 1977, there is disclosed a fuel atomizer which includes screened apertures positioned between the carburetor and manifold.

As a further consideration, in an internal combustion engine the pollutants are constituted by oxides of nitrogen, unburned hydrocarbons and carbon monoxide. However, it is not only the emission from the engine exhaust into the atmosphere which creates an ecological problem, but the emitted substances as well give rise to chemical reactions in the atmosphere when radiant energy is supplied by the sun. Thus, the smog now encountered in many major cities is largely the result of photochemical reactions involving unburned hydrocarbons from automobile exhausts. These unburned hydrocarbons are also responsible for inefficient engine operation, in that carbon deposits are formed on the walls of the combustion chambers. With many existing internal combustion engines, a measurable portion of the fuel supplied thereto remains unburned and is discharged. This not only results in an uneconomical engine operation, but it also contaminates the atmosphere.

SUMMARY OF THE INVENTION

Briefly described in one aspect of the present invention, there is provided an apparatus including a fuel chamber connected with a vehicle fuel tank and internal combustion engine carburetor, and a chamber adjacent the fuel chamber and containing a heat medium for heating and vaporizing the fuel within the fuel chamber. The apparatus further comprises a vaporization assembly mounted between the carburetor and intake manifold of an engine and including a frame defining apertures corresponding to those of the carburetor and manifold, the assembly including in consecutive order a first screen covering the apertures, a conduit including a heat medium extending within the apertures, and a second screen covering the apertures. Means are provided for heating the fluid heat medium, and pump means are also provided for moving the fuel and the heat medium through the respective chambers.

It is an object of the present invention to provide an apparatus which assists in preheating the carburetor of an internal combustion engine.

Another object of the present invention is to provide an apparatus to preheat and assist in the vaporization of the fuel for an internal combustion engine.

It is a further object of the present invention to provide an apparatus meeting the above criteria and being self-contained and independent of the other components of the engine.

It is a further object of the present invention to provide an apparatus of the aforementioned type and which provides more efficient burning of fuel and correspondingly reduced exhaustion of pollutants and contaminants.

Further objects and advantages of the present invention will become apparent from the description of the preferred embodiment which follows.

DESCRIPTION OF THE PREFERRED EMBODIMENT

Figure 1:
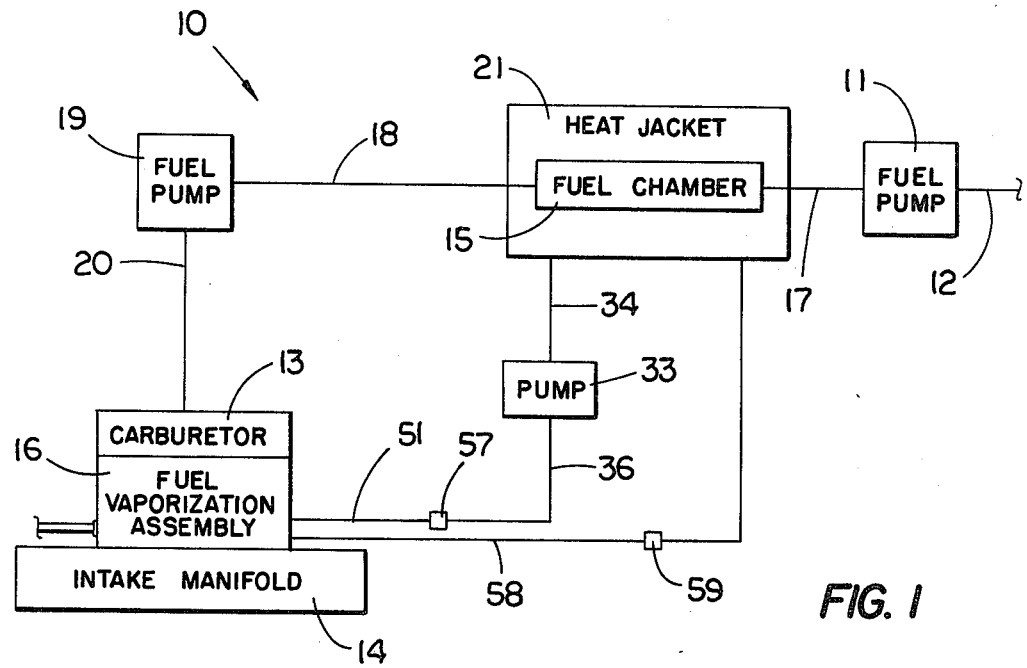
FIG. 1 is a schematic diagram of an apparatus constructed in accordance with the present invention and shown mounted with the components of an internal combustion engine system.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention provides an apparatus for preheating the fuel and carburetor for an internal combustion engine and for improving the vaporization of the fuel to provide more complete burning. As a consequence, better and more economical operation of the engine is realized, and the amount of pollutants entering the atmosphere is reduced. It is a particular feature of the present invention that the apparatus is readily mountable to an engine and is generally self-contained, with the exception that an energy source such as a hook-up with the engine battery is desirable.

Referring particularly to the drawings, there is shown an apparatus 10 constructed in accordance with the present invention, and shown in FIG. 1 mounted to components of the internal combustion engine system, such as for an automobile. In the typical engine system, a fuel pump 11 connects directly by a line 12 to a fuel tank, and introduces the fuel into the carburetor 13. The carburetor is mounted adjacent the intake manifold 14 and operates to vaporize the fuel and combine it with air to form the fuel/air combustion mixture. In accordance with the present apparatus, however, there are two chambers interposed in this fuel distribution system. A fuel chamber 15 is positioned between the fuel pump 11 and carburetor 13, and a fuel vaporization assembly 16 is mounted between the carburetor 13 and the intake manifold 14. The fuel chamber 15 is connected by a first line 17 to the system fuel pump 11. An outlet line 18 is connected to a second fuel pump 19 which in turn moves the fuel through the line 20 to the carburetor 13.

Figure 2:
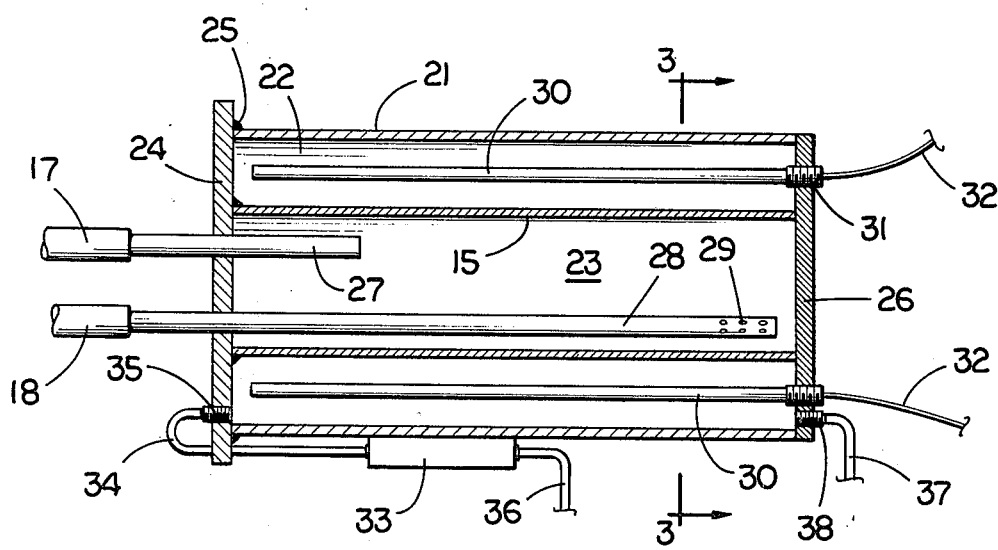
FIG. 2 is a side, cross-sectional view of the fuel and heat medium chambers of the present invention.
Figure 3:
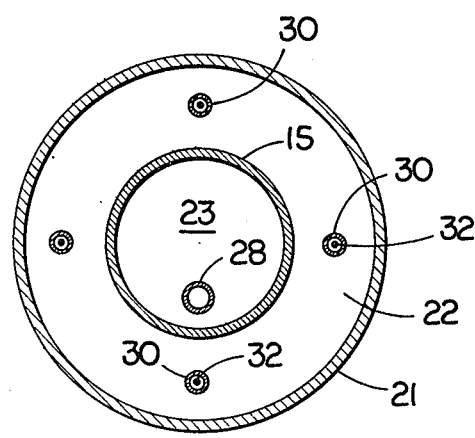
FIG. 3 is an end, cross-sectional view of the chambers shown in FIG. 2, taken along line 3—3 and looking in the direction of the arrows.

As shown particularly in FIGS. 2 and 3, the apparatus includes a heat media chamber 21 positioned adjacent the fuel chamber 15 and operable to provide heat transfer from a heat media 22 within the heat chamber 21 to the fuel 23 within the fuel chamber 15. It will be appreciated that a wide variety of physical arrangements could be employed to provide the heat transfer from the heat media to the fuel. In the preferred embodiment, the fuel chamber 15 is cylindrical and is received within a cylindrical heat chamber 21 which forms a heating jacket around the fuel chamber to effect heat transfer. In particular, a pair of cylinders are mounted to a first end plate 24 and preferably secured as by welding 25. A second end plate 26 is welded to each of the cylinders at the opposite end, or alternatively is removably secured to the cylinders to provide access within the chambers. Means for the removable attachment of the end plate 26 to the cylinders are well known, and therefore not detailed herein. A pair of tubes 27 and 28 are sealingly received within apertures in the end plate 24. The first tube 27 connects with line 17 and the fuel is pumped into the fuel chamber 15 by operation of the fuel pump 11 forcing the fuel through the tube 27. The tubes 27 and 28 are preferably positioned to have their openings in spaced apart locations within the fuel chamber to provide for circulation of fuel through the chamber before passing from the first tube 27 to the second tube 28. As shown, the first tube 27 may extend only a short distance through the end plate 24, whereas the second tube 28 extends to a location adjacent the second end plate 26. The second tube 28 is connected to the line 18 which connects with the fuel pump 19 for movement of the heated fuel from the fuel chamber to the carburetor. Tube 28 may be provided with several apertures 29 to further facilitate the entry of the fuel into the tube.

Several closed tubes 30 extend within the heat chamber 21, and preferably are mounted by the reception of a threaded head portion 31 within threaded apertures in the end plate 26. In this manner, the tubes may be removed for inspection or replacement, and also the assembly of the apparatus is facilitated. The closed tubes 30 are open at the outside end to permit the insertion of electrodes 32 therein. The electrodes 32 are connected to a suitable power source, such as the battery associated with the internal combustion engine, to heat the electrodes and consequently heat the media 22 within the heat chamber 21.

A pump 33 is provided for circulating the heat media 22 around and through the heat chamber 21. Pump 33 connects with the interior of the heat chamber through line 34 which is secured, such as by a threaded connector 35 to an aperture in the end plate 24. As will be further detailed below, the pump 33 includes an outlet line 36 which directs the heat media to the fuel vaporization assembly. A return line 37 from the fuel vaporization assembly connects with the interior of the heat chamber, such as by attachment with a threaded connector 38 received within a threaded aperture in the end plate 26.

In accordance with the described construction, an apparatus is provided for heating the fuel received from the fuel tank or other suitable source prior to passage of the fuel into the carburetor. The heating of the fuel is accomplished by heat transfer between the heat media in the heat chamber and the fuel within the fuel chamber located adjacent the heat chamber. The means for heating the fuel is advantageously a substantially self-contained unit which is readily attachable to an internal combustion engine system, and particularly which requires only the attachment of the lines 27 and 28 to the respective fuel lines, and the attachment of the electrodes 32 or another suitable heat means to a power source.

Figure 4:
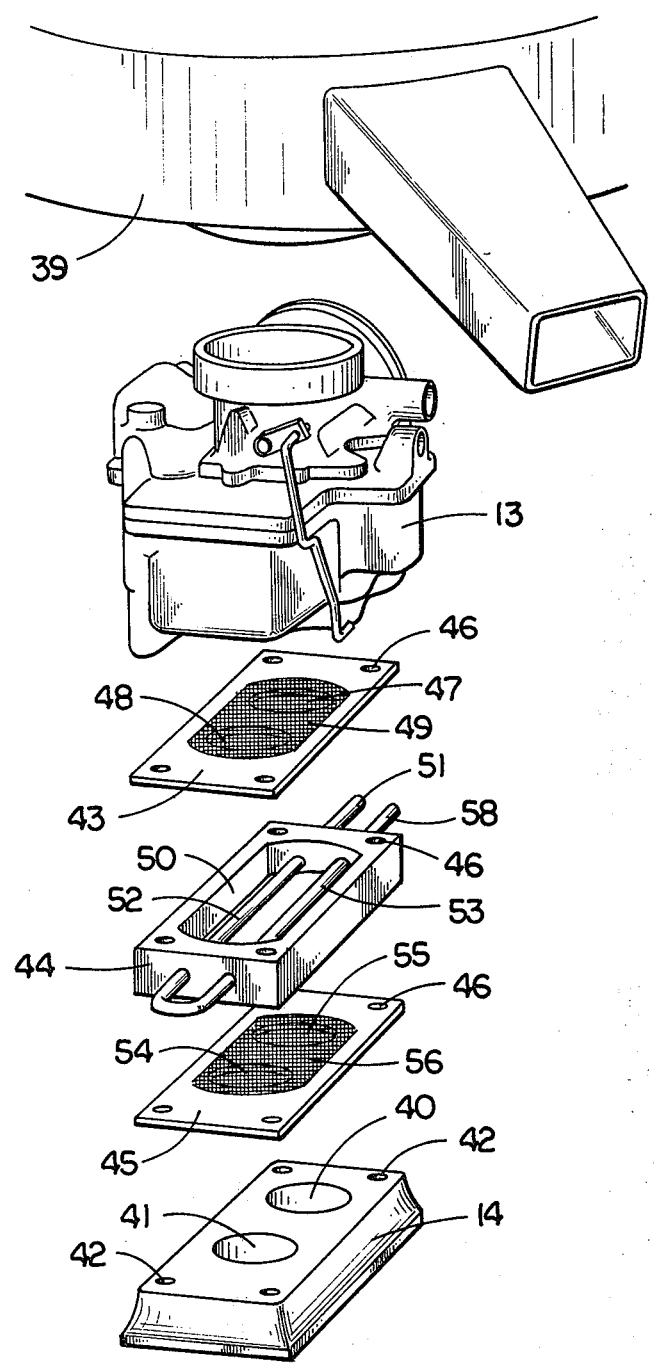
FIG. 4 is an exploded, perspective view of the vaporization assembly of the present invention and its mounting to the carburetor and intake manifold of an engine.

Referring now in particular to FIG. 4, there is shown the fuel vaporization assembly 16 in a preferred embodiment for the present invention. The fuel vaporization assembly 16 is mounted between the carburetor 13 and the intake manifold 14, and an air filter 39 is typically disposed upon the carburetor. The carburetor and manifold include aligned apertures 40 and 41 through whih the air/fuel mixture passes, and also provides for connection of the two with bolts received in the threaded holes 42 in the manifold. The vaporization assembly 16 preferably comprises three separate frame members 43–45, each of the frame members including holes 46 through which the bolts are received for connecting the frame members with the carburetor and manifold.

The first frame member 43 includes a pair of apertures 47 and 48 which are aligned with the apertures 40 and 41 in the carburetor and manifold. A screen material 49 is secured to the frame member 43 to cover the holes 47 and 48. The second frame member 44 includes a center aperture 50 which is sufficiently large to encompass the holes such as 40 and 41. A tube 51 extends through apertures in each of the ends of the frame member 44 and thereby positions a pair of tube portions 52 and 53 extending in the path of the holes 40 and 41. The third frame member 45 may be identical with the first frame member 43 and includes a pair of holes 54 and 55, and a screen material 56 secured to the frame member and covering the holes.

The tube 51 is connected, such as by connector 57, with the line 36 extending from the heat media pump 33. A tube portion 58 extends between the tube portion 53 and line 37 and is connected with the line 37 by a connector 59. By this interconnection, the pump 33 is operable to pump the heat medium from the heat chamber 21 through the tube portions 52 and 53 within the vaporization assembly 16, and then back in a recirculation path to the heat chamber 21. The heat means provided by the electrodes 32 received within the closed tubes 30 will operate to heat the heat medium which in turn will both heat the fuel within the fuel chamber 15, and also provide heat through the tube portions 52 and 53 to the pathway between the carburetor and the intake manifold.

From the preceding description, the operation of the present invention is apparent. Initially, and particularly in cold weather to facilitate starting, the electrodes are turned on by a suitable switching means to generate heat within the closed tubes, and thereby transmit the heat to the heat medium in the heat chamber. The heated media, preferably a liquid, is pumped through the connecting lines to the fuel vaporization assembly 16, by operation of pump 33. It will be noted that a single switch may be conveniently used to engage the pump 33 and the electrodes 32, the pump preferably being an electric pump. The circulation of the hot fluid through the tube portions 52 and 53 will serve to preheat the carburetor, whereas the circulation of the hot fluid through the heat chamber 21 will serve to preheat the fuel within the fuel chamber. Gasoline is pumped from the automobile supply tank by the engine fuel pump 11 into the fuel chamber 15. The fuel 23 has a sufficient residence time within the fuel chamber to achieve a desired temperature, and could in fact be vaporized within the fuel chamber. The heating of the fuel will in fact cause it to expand within the chamber.

The heated and expanded fuel is pumped by the fuel pump 19 to the carburetor 13. The carburetor operates in usual fashion to atomize the fuel and create a rough fuel/air mixture. This mixture passes through the openings from the carburetor to the intake manifold, and therefore passes through the holes provided by the fuel vaporization assembly. The vaporization assembly operates to improve the vaporization and mixing of the fuel in the air mixture as follows. Upon entering the assembly 16, the fuel particles pass through the screen 49 and are caused to break up into finer droplets. The heat caused by the heat medium circulating through the tube portions 52 and 53 will assist in vaporizing the fuel as it passes thereover. In addition, the fuel/air mixture is thereafter passed through a second screen 56 which serves to further improve the vaporization and mixing of the fuel in the air.

It will be appreciated that a variety of changes may be effected in the preferred embodiment described herein without departing from the present invention. In a particularly preferred arrangement, the fuel and heat chambers and the vaporization assembly components are formed from aluminum, as is preferably the case for the interconnecting tubing. The aluminum material is desirable since it is light in weight, provides the adequate strength necessary, and conducts heat readily. In a preferred embodiment, the fuel chamber cylinder has a diameter of three inches and a length of eight inches, with the heat chamber having a diameter of four inches and eight inch length.

In accordance with the present invention, an apparatus is provided for preheating the fuel and carburetor for an internal combustion engine, and for improving vaporization of the fuel. The preheated carburetor is beneficial to permitting faster starts in cold weather. The heating and expansion of the gas, followed by the improved vaporization of the fuel, results in better burning, more economical operation of the engine, and a reduction in undesirable emissions.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for preheating the fuel and carburetor and for improving vaporization of the fuel, said apparatus being for use with an internal combustion engine having a fuel tank connectable to the carburetor mounted to an intake manifold, which comprises:
    a fuel chamber;
    first connecting means for connecting said fuel chamber to the fuel tank;
    second connecting means for connecting said fuel chamber to the carburetor;
    a heat chamber adjacent said fuel chamber;
    a vaporization assembly mounted between the carburetor and the intake manifold and including a frame defining an aperture corresponding to openings in the carburetor and intake manifold, said vaporization assembly including, consecutively, a first screen covering the aperture of the frame, a vaporizer conduit extending into the aperture of the frame, and a second screen covering the aperture of the frame;
    conduit means for connecting the vaporizer conduit with said heat chamber;
    a heat medium within said heat chamber, the vaporizer conduit and said conduit means;
    heat means for heating the heat medium within said heat chamber;
    first pump means for moving fuel from said fuel chamber to the carburetor; and
    second pump means for circulating said heat medium through said heat chamber, the vaporizer conduit, and said conduit means.

2. The apparatus of claim 1 in which said heat medium is a liquid.

3. The apparatus of claim 1 in which said heat means comprises closed tubes extending within said heat chamber and electrodes received within the closed tubes.

4. The apparatus of claim 1 in which said vaporizer assembly includes three frame members, the first and second screens being mounted to the first and third frame members, the vaporizer conduit being mounted to the second frame member.

5. The apparatus of claim 1 in which said heat chamber is positioned about said fuel chamber.

6. The apparatus of claim 5 in which said heat means comprises closed tubes extending within said heat chamber and electrodes received within the closed tubes.

7. The apparatus of claim 5 in which said fuel chamber and said heat chamber are concentric cylinders.

8. The apparatus of claim 7 in which said heat means comprises closed tubes extending within said heat chamber and electrodes received within the closed tubes.

9. The apparatus of claim 8 in which said vaporizer assembly includes three frame members, the first and second screens being mounted to the first and third frame members, the vaporizer conduit being mounted to the second frame member.

10. The apparatus of claim 9 in which said heat medium is a liquid.

* * * * *